United States Patent
Ratasuk et al.

(10) Patent No.: US 12,549,317 B2
(45) Date of Patent: Feb. 10, 2026

(54) METHOD FOR ACKNOWLEDGMENT FEEDBACK IN NON-TERRESTRIAL NETWORKS

(71) Applicant: Nokia Technologies Oy, Espoo (FI)

(72) Inventors: Rapeepat Ratasuk, Inverness, IL (US); Jeroen Wigard, Klarup (DK); Mads Lauridsen, Gistrup (DK); Frank Frederiksen, Klarup (DK)

(73) Assignee: NOKIA TECHNOLOGIES OY, Espoo (FI)

(*) Notice: Subject to any disclaimer, the term of this patent is extended or adjusted under 35 U.S.C. 154(b) by 329 days.

(21) Appl. No.: 18/246,580

(22) PCT Filed: Sep. 16, 2021

(86) PCT No.: PCT/EP2021/075468
§ 371 (c)(1),
(2) Date: Mar. 24, 2023

(87) PCT Pub. No.: WO2022/078704
PCT Pub. Date: Apr. 21, 2022

(65) Prior Publication Data
US 2024/0014983 A1  Jan. 11, 2024

Related U.S. Application Data

(60) Provisional application No. 63/198,340, filed on Oct. 12, 2020.

(51) Int. Cl.
*H04L 5/00* (2006.01)
(52) U.S. Cl.
CPC .................. *H04L 5/0055* (2013.01)

(58) Field of Classification Search
CPC ................. H04L 5/0055; H04L 1/0034; H04L 1/1822; H04L 1/1864; H04L 1/1896; H04L 5/006; H04L 5/0091; H04L 1/1854; H04W 72/23
See application file for complete search history.

(56) References Cited

U.S. PATENT DOCUMENTS

| | | |
|---|---|---|
| 6,567,388 B1 | 5/2003 | Tomcik et al. |
| 6,775,707 B1 | 8/2004 | Bennett et al. |
| 6,831,912 B1 | 12/2004 | Sherman |
| 2005/0213586 A1 | 9/2005 | Cyganski et al. |
| 2008/0285581 A1 | 11/2008 | Maiorana et al. |
| 2019/0215097 A1* | 7/2019 | Wang .................... H04L 1/0026 |
| 2019/0261354 A1 | 8/2019 | Fakoorian et al. |
| 2020/0052831 A1 | 2/2020 | Yang et al. |

(Continued)

FOREIGN PATENT DOCUMENTS

| | | | |
|---|---|---|---|
| WO | 2019/160737 A1 | 8/2019 | |
| WO | WO-2020089851 A1 * | 5/2020 | ............... H04L 1/08 |
| WO | 2021/035393 A1 | 3/2021 | |

OTHER PUBLICATIONS

Office Action received for corresponding European Patent Application No. 21778042.8, dated Feb. 12, 2025, 7 pages.

(Continued)

*Primary Examiner* — Jae Y Lee
(74) *Attorney, Agent, or Firm* — Lippes Mathias LLP

(57) ABSTRACT

Various techniques are provided for generating and communicating an acknowledgement/negative acknowledgement (ACK/NACK).

18 Claims, 12 Drawing Sheets

(56) References Cited

U.S. PATENT DOCUMENTS

| | | | |
|---|---|---|---|
| 2021/0377793 A1* | 12/2021 | Moilanen | H04L 43/0847 |
| 2023/0275705 A1* | 8/2023 | Muruganathan | H04L 1/1861 |
| | | | 370/329 |
| 2023/0308218 A1* | 9/2023 | Dimou | H04L 1/0003 |

OTHER PUBLICATIONS

"3rd Generation Partnership Project; Technical Specification Group Radio Access Network; NR; Physical layer procedures for control (Release 16)", 3GPP TS 38.213, V16.2.0, Jun. 2020, pp. 1-176.

"Solutions for NR to support non-terrestrial networks (NTN)", 3GPP TSG RAN meeting #86, RP-193234, Agenda: 9.1.2, Thales, Dec. 9-13, 2019, 10 pages.

"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.

"Summary#3 of AI 8.4.3 for HARQ in NTN", 3GPP TSG RAN WG1 #102-E, R1-2007311, Agenda: 8.4.3, ZTE, Aug. 17-28, 2020, pp. 1-37.

Shariatmadari et al., "Asymmetric ACK/NACK Detection for Ultra-Reliable Low-Latency Communications", European Conference on Networks and Communications (EuCNC), Jun. 18-21, 2018, pp. 162-166.

International Search Report and Written Opinion received for corresponding Patent Cooperation Treaty Application No. PCT/EP2021/075468, dated Nov. 29, 2021, 11 pages.

* cited by examiner

METHOD FOR ACKNOWLEDGMENT FEEDBACK IN NON-TERRESTRIAL NETWORKS

RELATED APPLICATION

This application claims priority to PCT Application No. PCT/EP2021/075468, filed on Sep. 16, 2021, which claims priority to U.S. Provisional Application No. 63/198,340 filed on Oct. 12, 2020, each of which is incorporated herein by reference in its entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UNITS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include receiving, at a user equipment (UE) from a network device, a message including an acknowledgement/negative acknowledgement (ACK/NACK) configuration including information related to at least one trigger condition for communicating an ACK/NACK report to the network device, receiving, at the UE, at least one packet including data, determining, by the UE, at least one event satisfying the at least one trigger condition for communicating an ACK/NACK report to the network device has occurred, and in response to determining the event satisfying the at least one trigger has occurred, communicating an ACK/NACK report from the UE to the network device.

Implementations can include one or more of the following features, alone, or in any combination with each other. The method can further include receiving, at the UE, a message signalling to disable hybrid automatic repeat request (HARQ). The method can further include in response to determining the event satisfying the at least one trigger has occurred, determine whether there is an error associated with the decoding at least one packet including data, and in response to determining there is an error associated with the at least one packet including data generating the ACK/NACK report and communicating the ACK/NACK report only if there is an error associated with the at least one packet including data. The at least one packet including data received by the UE can include two or more packets including data received by the UE, and the at least one trigger is based on a number of the two or more packets including data received by the UE. The at least one packet including data received by the UE can include two or more packets including data received by the UE has been received over a period of time, and the at least one trigger can be based on an amount of elapsed time since the UE has receive a first packet after communicating an earlier in time ACK/NACK report. The trigger can be based on a block error rate (BLER) associated with the at least one packet including data. The at least one packet can include two or more packets that were received sequentially, the method further including generating a BLER based on an error condition associated with each of the two or more packets. The at least one trigger can be based on a message received by the UE from the network device, the message requesting the ACK/NACK report. The at least one trigger can be based on characteristics of the data. The at least one packet can include two or more packets that were received sequentially, the method further including generating the ACK/NACK report to include the ACK/NACK from each of the two or more packets.

According to an example embodiment, a method may include communicating, from a network device to a user equipment (UE), a message including an acknowledgement/negative acknowledgement (ACK/NACK) configuration including information related to at least one trigger condition for communicating an ACK/NACK report to the network device, generating, at the network device, at least one packet including data, communicating, from the network device to the UE, the at least one packet including data, and receiving, by the network device from the UE, a message including an ACK/NACK report, the ACK/NACK report being generated in response to at least one event satisfying the at least one trigger condition at the UE.

Implementations can include one or more of the following features, alone, or in any combination with each other. The method can further include communicating, from the network device, at the UE, a message signalling the UE to disable hybrid automatic repeat request (HARQ). The at least one packet including data can include two or more packets including data and the at least one trigger is based on a number of the two or more packets including data communicated to the UE. The at least one packet including data can include two or more packets including data, the two or more packets are communicated over a period of time, and the at least one trigger is based on an amount of elapsed time after the UE has communicated an earlier in time ACK/NACK report. The at least one trigger can be based on a block error rate (BLER) associated with the at least one packet including data. The at least one trigger can be based on a message communicated by the network device to the UE, the message requesting the ACK/NACK report. The at least one trigger can be based on characteristics of the data. The at least one packet can include two or more packets that were received sequentially and the ACK/NACK report to include the ACK/NACK from each of the two or more packets.

According to an example embodiment, a method may include communicating, from a network device to a user equipment (UE), communicating, from the network device, at the UE, a message signalling the UE to disable hybrid automatic repeat request (HARQ), determining, at the network device, that at least one packet including data is ready for transmission, determining, at the network device, whether an acknowledgement/negative acknowledgement (ACK/NACK) feedback is required from the UE, in response to determining ACK/NACK feedback is required communicating scheduling information associated with communicating the at least one packet including data and scheduling information associated with an ACK/NACK request from the network device to the UE and communicating, from the network device to the UE, the at least one packet including data.

Implementations can include one or more of the following features, alone, or in any combination with each other. The method can further include receiving an ACK/NACK report in response to the ACK/NACK request and the communicated at least one packet including data.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

DETAILED DESCRIPTION

Figure 1A:
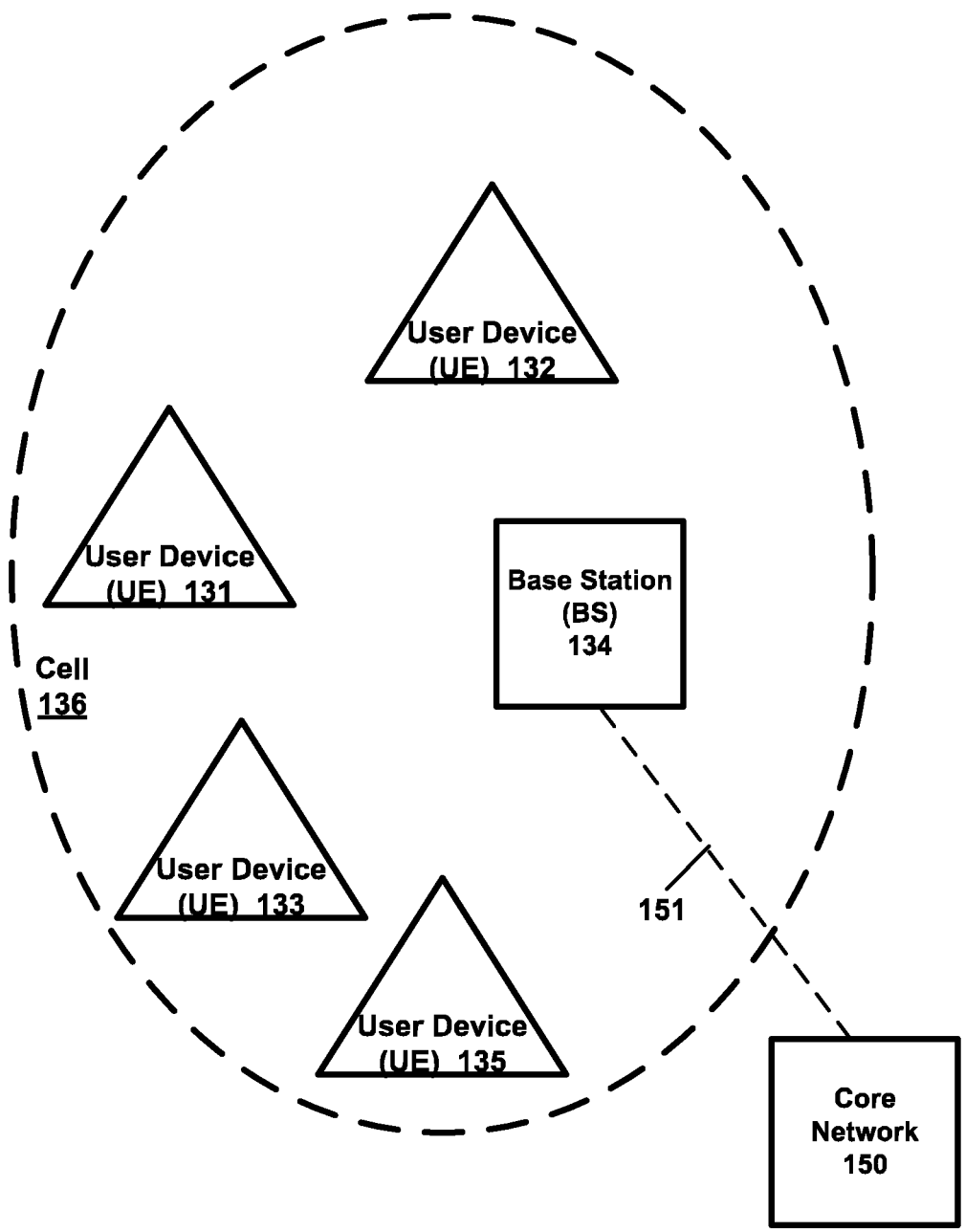
FIGS. 1A and 1B are block diagrams of a wireless network according to an example embodiment.
Figure 1B:
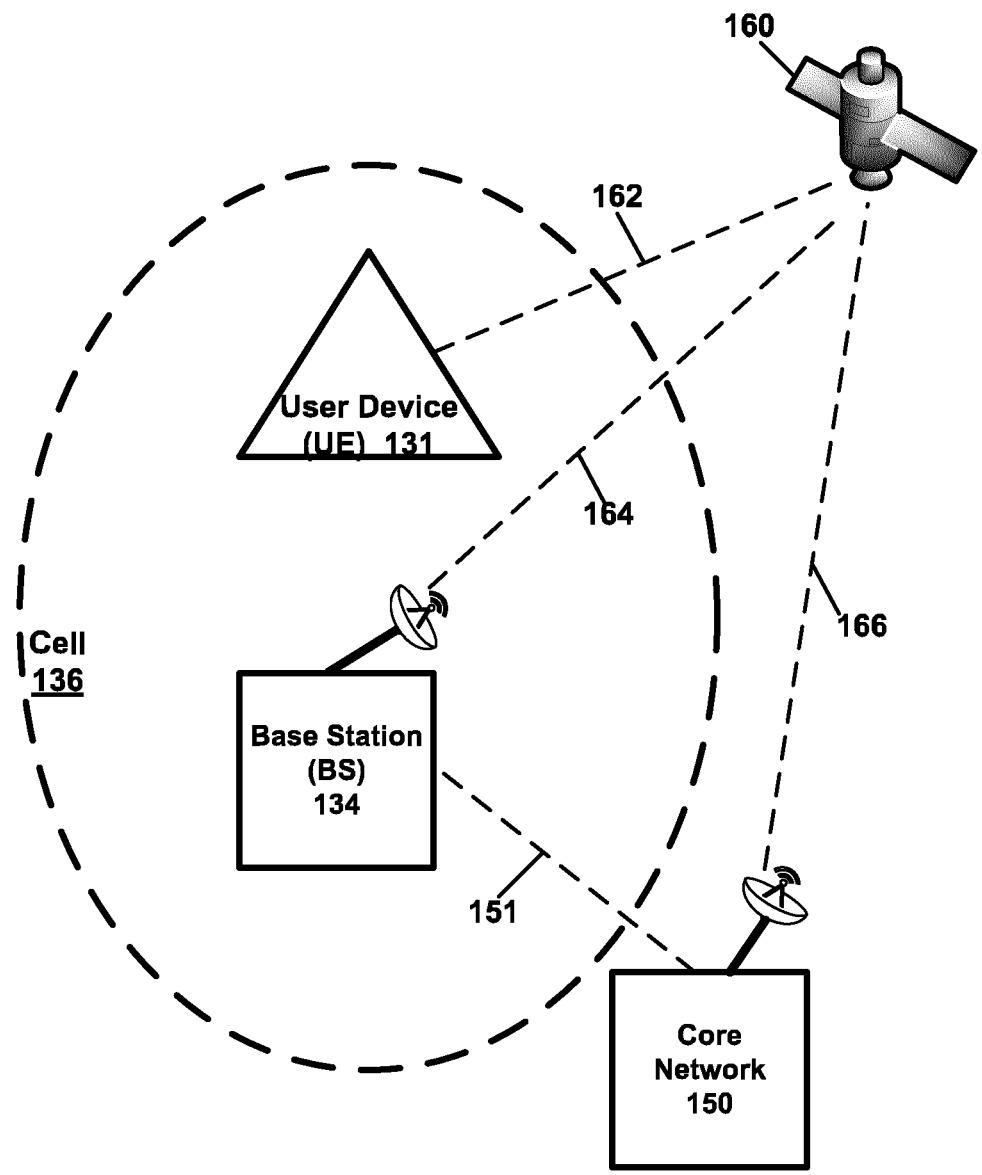

FIG. 1A is a block diagram of a wireless network 130 according to an example embodiment. FIG. 1B is a block diagram of a wireless network 140 according to an example embodiment. In the wireless network 130 of FIG. 1A and/or the wireless network 140 of FIG. 1B, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably.

The BS 134 can be referred to as a terrestrial BS. The wireless network 140 can extend the wireless network 130 to further include a non-terrestrial network (NTN) base station (NTN-BS) 160. NTN-BS 160 can be implemented in a low-earth orbit (LEO) satellite, a medium-earth orbit (MEO) satellite, a geostationary earth orbit (GEO) satellite, a high elliptical orbit (HEO) satellite, an unmanned aircraft system (UAS), a lighter than air (LTA) UAS, a heavier than air (HTA) UAS, and/or the like. Further, the NTN-BS can be on the ground with the signals being routed through the satellite.

A BS (including a NTN-BS) may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS), NTN base station (NTN-BS), or (e)Node B (eNB), BS, RAN node) may also be carried out by any node, server or host which may be operably coupled to a transceiver, such as a remote radio head or satellite. BS (or AP) 134 provides wireless coverage within a cell 136, including to user devices (or UEs) 131, 132, 133 and 135. NTN-BS 160 can provide wireless coverage within a cell 136, within a plurality of cells (not shown) and/or within a geographic coverage area. Although only four user devices (or UEs) are shown as being connected or attached to BS 134 and/or NTN-BS 160, any number of user devices may be provided. BS 134 and is also connected to a core network 150 via a S1 interface or NG interface 151. NTN-BS 160 is also connected to the UEs (shown as UE 131) via a Uu interface 162. NTN-BS 160 is also connected to the BS 134 via a SI/NG interface 164. NTN-BS 160 is also connected to core network 150 via a S1 interface or NG interface 166. These are merely one simple example of a wireless network, and others may be used.

A base station (e.g., such as BS 134 and/or NTN-BS 160) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU- CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network (e.g., which may be referred to as 5GC in 5G/NR).

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), massive MTC (mMTC), Internet of Things (IoT), and/or narrowband IoT (NB-IoT) user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, mMTC, eMBB, URLLC, etc., or any other wireless network or wireless technology. These example networks, technologies or data service types are provided only as illustrative examples.

In NTN, the round-trip time (RTT) can be very long due to the large distance between the NTN-BS (e.g., satellite) and the UE. An example RTT for GEO or geo-stationary deployment using bent-pipe or regenerative satellite is shown in Table 1.

TABLE 1

Round-trip time for geo-stationary satellite.

| | GEO at 35786 km | | |
|---|---|---|---|
| Elevation angle | Path | D (km) | Time (ms) |
| UE: 10° | satellite - UE | 40586 | 135.286 |
| GW: 5° | Satellite - gateway | 41126.6 | 137.088 |
| 90° | satellite - UE | 35786 | 119.286 |
| | Bent Pipe satellite | | |
| One way delay | Gateway-satellite_UE | 81712.6 | 272.375 |
| Round trip Time | Twice | 163425.3 | 544.751 |
| | Regenerative Satellite | | |
| One way delay | Satellite -UE | 40586 | 135.286 |
| Round Trip Time | Satellite-UE-Satellite | 81172 | 270.572 |

Figure 2:
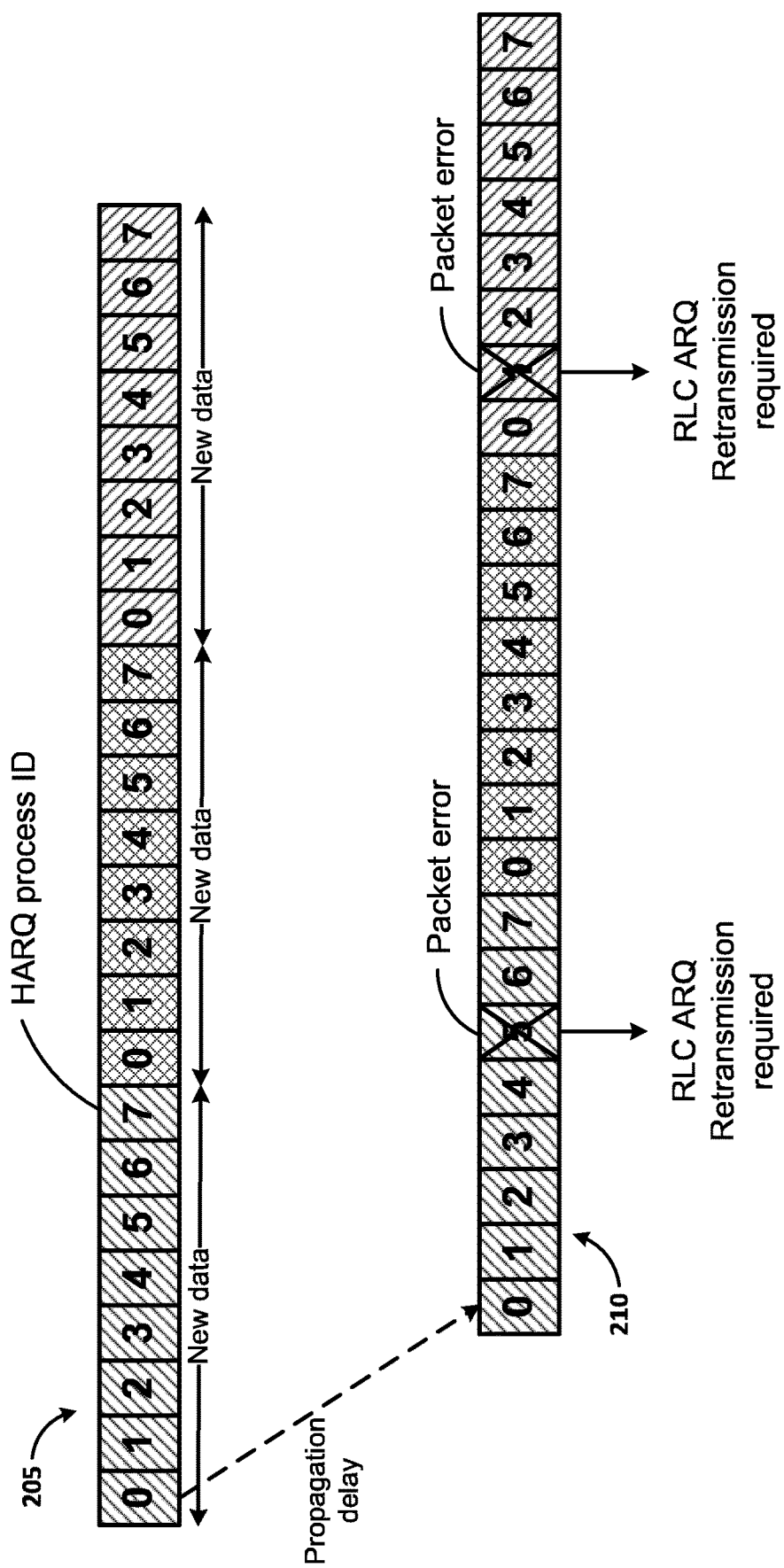
FIG. 2 is a diagram illustrating a transmission according to an example embodiment.

For eMBB traffic, the large RTT can reduce the throughput significantly as the number of HARQ processes can be much smaller than the RTT (e.g., 16 HARQ processes are available in NR while the RTT can be as high as 544 ms). To overcome the undesirable effects of RTT, example implementations can disable HARQ (i.e., no HARQ retransmission). FIG. 2 illustrates downlink transmission with HARQ disabled. As shown in FIG. 2 transmitted data or control packets 205 (e.g., DL data) can be communicated (e.g., by NTN-BS 160) and corresponding received data or control packets 210 can be received by UE (e.g., UE 131). The communication can have a propagation delay (e.g., a 14 ms delay). The received data or control packets 210 can include packet errors (two (2) packet errors are shown). Packet errors can require ARQ retransmission. The retransmissions can be performed at the RLC level when using downlink transmission with HARQ disabled.

As described above disabling HARQ (i.e., no HARQ retransmission) can be implemented as a technique used to improve NTN throughput for deployment scenarios with large RTT. Without HARQ retransmission, the network can also disable ACK/NACK feedback to save PUCCH overhead and UE battery life.

A link adaptation algorithm can depend on ACK/NACK feedback to continuously update the threshold for MCS selection based on the target Block Error Rate (BLER). Link adaptation can be important in NTN because CQI may be stale and unreliable due to the long propagation delay. As a result, disabling ACK/NACK feedback can cause link adaption (outer-loop and inner-loop) to not function as intended and the gNB scheduler may not perform as desired.

The link adaptation adjustment algorithms may not function as intended when the delay for the feedback cycle becomes extremely long. The delay from data transmission to the feedback information on the success or lack of success may cause the link adaptation adjustment algorithms to not function as intended. During the time without delay, the scheduler may be operating without data related to the feedback (sometimes called operating blind). Should multiple consecutive errors occur in a row, the scheduler may have some risk of overcompensating. Further, the scheduler may enter an undesirable oscillating state due to the loop delay.

Therefore, a method where ACK/NACK feedback from UE is minimized to save overhead and UE battery life, but sufficient ACK/NACK feedback information is still being provided to the network for link adaptation purpose (even though HARQ retransmission may be disabled) is needed.

In example an implementation, the network can configure when and how the UE will report ACK/NACK information when the feedback for one or more DL HARQ processes is disabled. For example, the network can disable DL HARQ (e.g., by setting maximum number of transmissions to 1). Next the network can communicate a message to the UE. The message can indicate an ACK/NACK reporting process. The UE can communicate an ACK/NACK to the network based on the ACK/NACK reporting process. Example implementations can introduce a technique for enhanced HARQ feedback, which may enable (or help enable) the gNB to operate its link adaptation tuning algorithms in long feedback delay conditions.

Figure 3:
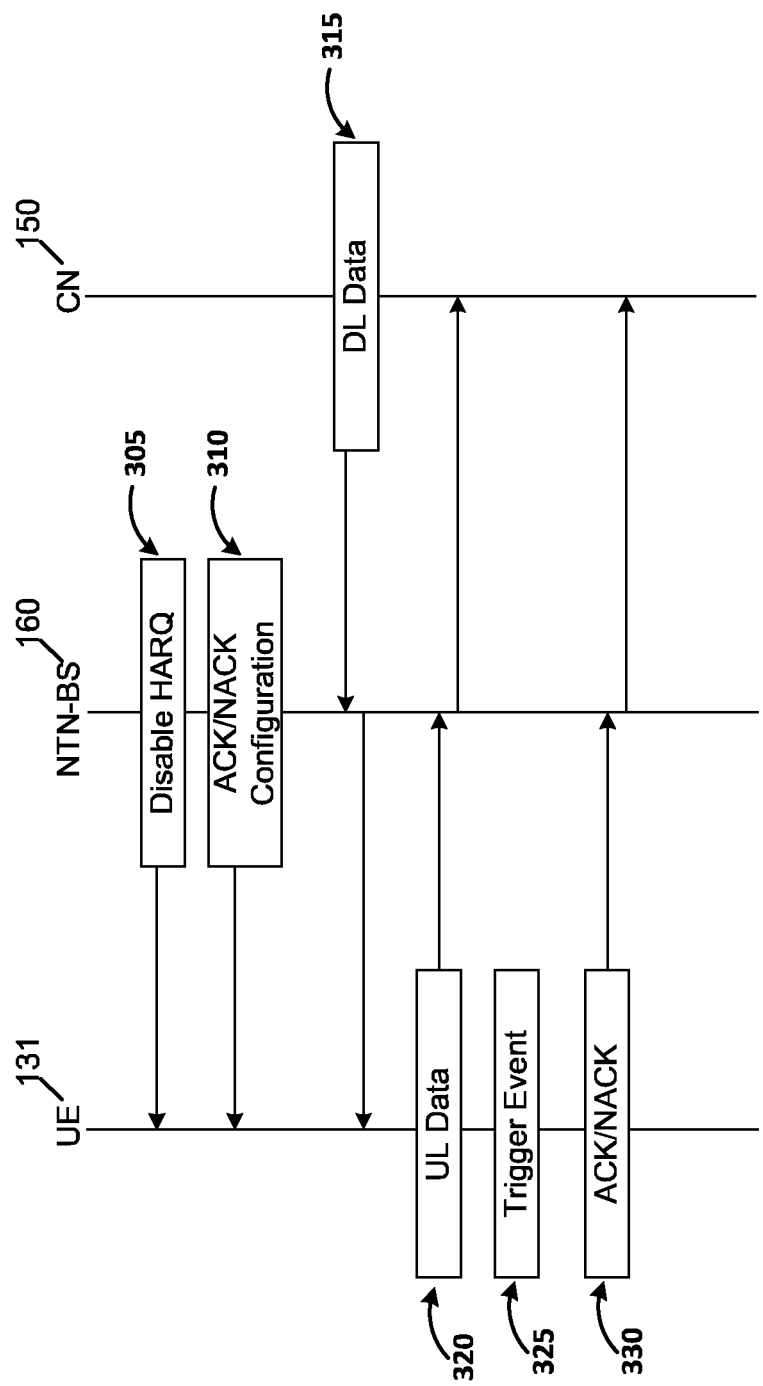
FIG. 3 is a diagram illustrating a message flow in which an ACK/NACK can be configured and communicated according to an example embodiment.

FIG. 3 is a diagram illustrating a message flow in which an ACK/NACK can be configured and communicated according to an example embodiment. As shown in FIG. 3, the UE 131, the NTN-BS 160, and the CN 150 are communicatively coupled as described above. The message flow begins with the NTN-BS 160 or the BS 134 generating a disable HARQ message 305. The disable HARQ message 305 can include an instruction setting a maximum number of transmissions to 1. The disable HARQ message 305 can be communicated to the UE 131 via the NTN-BS 160.

The NTN-BS 160 can generate an ACK/NACK configuration message 310. The ACK/NACK configuration message 310 can include information (e.g., data, metadata, instructions, and/or the like) related to an ACK/NACK technique. For example, the ACK/NACK configuration message 310 can include a trigger indicating what can cause (or when) the UE 131 is to communicate an ACK/NACK to the CN 150 (or any other network device).

In an example implementation, the trigger can be based on a number of DL data packets received by the UE 131. In an example implementation, the trigger can be based on an amount of elapsed time since communicating an earlier in time ACK/NACK report. In an example implementation, the trigger can be based on a block error rate (BLER) associated with the DL data packets received by the UE 131. In an example implementation, the trigger can be based on a message received by the UE 131 from the network device, the message requesting the ACK/NACK report. In an example implementation, the trigger can be based on characteristics of the data in the DL data packets received by the UE 131. In an example implementation, the trigger can be based on two or more of the above-mentioned triggers. Other triggers can be within the scope of this disclosure.

Next, the network goes into a data communication mode where DL data 315 is sent from the CN 150 to the UE 131 via the NTN-BS 160 and UL data 320 is sent from the UE 131 to the CN 150 via the NTN-BS 160. In some implementations, no UL data 320 is sent from the UE 131 to the CN 150. DL data 315 and UL data 320 can include any type of communicative data. For example, DL data 315 and/or UL data 320 can be related to text and/or voice data, image data, streaming video data, social network data, and/or the like.

In response to determining a trigger event 325 has occurred, the UE 131 can generate an ACK/NACK message 330. The ACK/NACK message 330 can be communicated to the CN 150 (or some other network device) via the NTN-BS 160. In an example implementation, the ACK/NACK message 330 can include a plurality (e.g., a bundle) of ACK/NACKs.

FIGS. 4, 5, 6 and 7 illustrate block diagrams of methods according to at least one example embodiment. The steps described with regard to FIGS. 4, 5, 6 and 7 may be performed due to the execution of software code stored in a memory associated with an apparatus (e.g., a UE, a BS, a CN, and/or the like) and executed by at least one processor associated with the apparatus. However, alternative embodiments are contemplated such as a system embodied as a special purpose processor. Although the steps described below are described as being executed by a processor, the steps are not necessarily executed by the same processor. In other words, at least one processor may execute the steps described below with regard to FIGS. 4, 5, 6 and 7.

Figure 4:
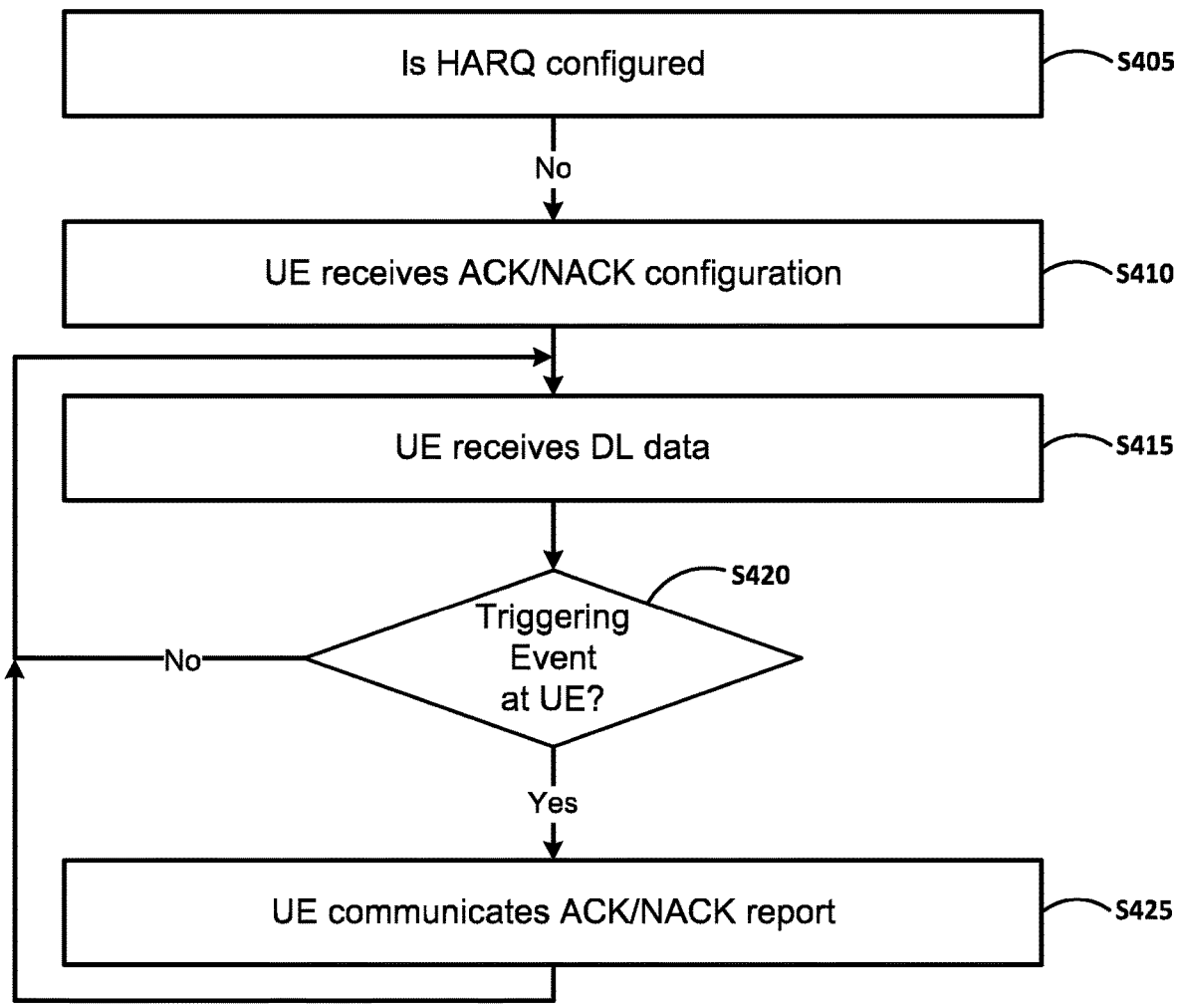
FIG. 4 is a flow chart illustrating operation of a user device according to an example embodiment.

FIG. 4 is a flow chart illustrating operation of a user device according to an example embodiment. As shown in FIG. 4, in step S405 HARQ is disabled. For example, the UE can receive a message (or signal) from the network. The message can be received via a BS (e.g., BS 134, a gNB, and/or the like). In an example implementation, the message can be received via an NTN-BS (e.g., NTN-BS 160). The message can include a data packet including an instruction (e.g., a setting or configuration instruction). For example, the instruction can turn HARQ off (e.g., HARQ_Enable=OFF).

In step S410 an ACK/NACK configuration is received by the UE. For example, the UE can receive a message from the network. The message can be received via a BS (e.g., an NTN-BS, a gNB, and/or the like). The message can be received on a physical downlink control channel (PDCCH), through RRC signalling, or on a physical downlink shared channel (PDSCH) via system information block or RRC signalling. In an example implementation, the message can be received via an NTN-BS (e.g., NTN-BS 160). The message can include a data packet including an instruction (e.g., a setting or configuration instruction). For example, the instruction can be an ACK/NACK configuration. The instruction can include a configuration setting for when the UE is to communicate an ACK/NACK to the network. The configuration setting may correspond to a trigger that causes the UE to generate an ACK/NACK report and to communicate the ACK/NACK report to the network. The ACK/NACK report can include, for example, individual or bundled ACK/NACK, number of ACKs and/or NACKs, or block error rate.

In an example implementation, the trigger can be based on a number of DL data packets received by the UE. In an example implementation, the trigger can be based on an amount of elapsed time since communicating an earlier in time ACK/NACK report or on an amount of elapsed time since receiving a DL data packet. In an example implementation, the trigger can be based on a block error rate (BLER) associated with the DL data packets received by the UE. In an example implementation, the trigger can be based on a message received by the UE from the network device, the message requesting the ACK/NACK report. In an example implementation, the trigger can be based on characteristics of the data in the DL data packets received by the UE. In an example implementation, the trigger can be based on two or more of the above-mentioned triggers. Other triggers can be within the scope of this disclosure.

In step S415 DL data is received by the UE. For example, the network can go into a data communication mode where DL data is communicated from the network to the UE via a BS (e.g., an NTN-BS). UL data can be communicated from the UE to the network via the BS (e.g., an NTN-BS) as well. The DL data and/or UL data can be related to text and/or voice data, image data, streaming video data, social network data, and/or the like. The DL data can be communicated over a channel (e.g., a downlink shared channel (DL-SCH), PDSCH or narrowband PDSCH (NPDSCH)).

In step S420 whether a triggering event has occurred at the UE is determined. For example, the UE can monitor (e.g., by a processor of the UE) transmissions for at least one of the herein mentioned triggers. As an example, the UE can count (e.g., keep a counter, monitor the transmission buffer, and/or the like) the number of DL data packets received. In response to the number of DL data packets received being equal to a configurable variable (N), the event can be triggered. In response to determining an event has been triggered, processing continues to step S425. Otherwise (no event triggered), processing returns to step S415.

In step S425 an ACK/NACK report is communicated by the UE. For example, the UE can generate a report based on one or more ACK's and or NACK's over a period of time, a number of DL packets and/or the like. The ACK/NACK report can be a report that includes a number of ACK's and a number of NACK's with or without information associated the packets that did not have an error (ACK) and/or the packets that did have an error (NACK). In some implementations, the report includes information about the packets with errors (NACK) and no information about the packets without errors (ACK). In other words, the network can infer that any packet that does not have information in the report does not have an error. The report can be communicated to the network via the BS (e.g., NTN-BS). The report can be communicated using a physical uplink control channel (PUCCH) or physical uplink data channel (PUSCH).

Figure 5:
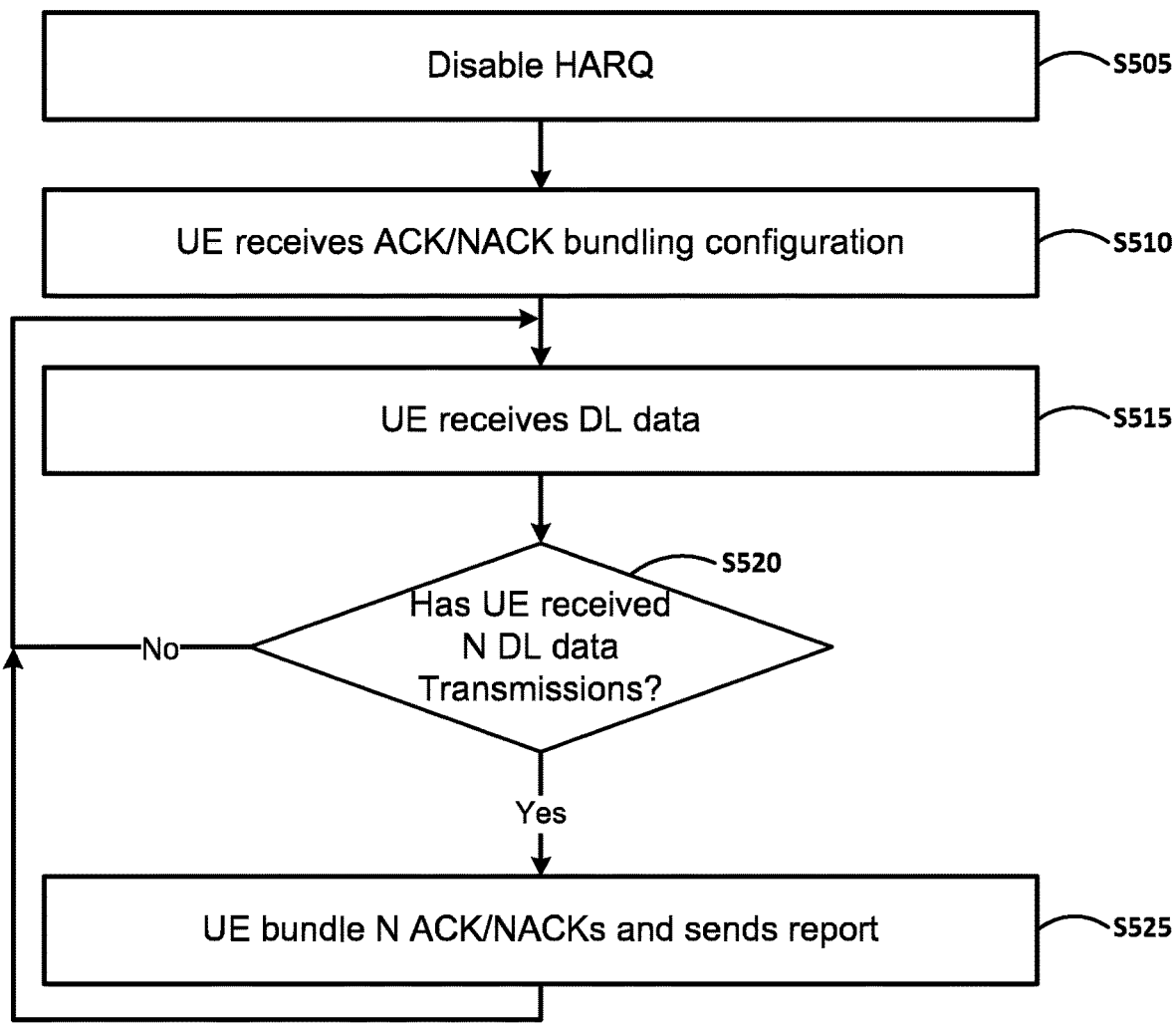
FIG. 5 is a flow chart illustrating operation of a user device according to an example embodiment.

FIG. 5 is a flow chart illustrating operation of a user device according to an example embodiment. In some implementations, the UE can bundle ACK/NACK associated with a plurality of DL data packets. As shown in FIG. 5, in step S505 HARQ is disabled. For example, the UE can receive a message (or signal) from the network. The message can be received via a BS (e.g., an NTN-BS, a gNB, and/or the like). In an example implementation, the message can be received via an NTN-BS (e.g., NTN-BS 160). The message can include a data packet including an instruction (e.g., a setting or configuration instruction). For example, the instruction can turn HARQ off (e.g., HARQ_Enable=OFF).

In step S510 an ACK/NACK bundling configuration is received by the UE. For example, the UE can receive a message from the network. The message can be received via a BS (e.g., an NTN-BS, a gNB, and/or the like). The message can be received on a PDCCH or PDSCH. In an example implementation, the message can be received via an NTN-BS (e.g., NTN-BS 160). The message can include a data packet including an instruction (e.g., a setting or configuration instruction). For example, the instruction can be an ACK/NACK configuration. The instruction can include a configuration setting for when the UE is to communicate an ACK/NACK to the network. The configuration setting may correspond to a trigger that causes the UE to generate an ACKNACK report and to communicate the ACK/NACK report to the network. Further, the instruction can include a configuration setting for how ACK/NACK's and/or what ACK/NACK's should be bundled in an ACK/NACK report. For example, the instruction can include a configuration setting to cause the bundling of ACK/NACK's from the last N DL data packets received.

In step S515 DL data is received by the UE. For example, the network can go into a data communication mode where DL data is communicated from the network to the UE via a BS (e.g., NTN-BS 160). UL data can be communicated from the UE to the network via the BS (e.g., NTN-BS 160) as well. The DL data and/or UL data can be related to text and/or voice data, image data, streaming video data, social network data, and/or the like. The DL data can be communicated over a channel (e.g., a downlink shared channel (DL-SCH), PDSCH).

In an example implementation, the trigger can be based on a number of DL data packets received by the UE. Therefore, in step S520 whether the UE has received N DL data transmissions is determined. The UE can count (e.g., keep a counter, monitor the transmission buffer, and/or the like) the number of DL data packets received. In response to the number of DL data packets received being equal to a configurable variable (N), the event can be triggered. In response to determining N DL packets have been received, processing continues to step S525. Otherwise (e.g., less than N DL packets are received), processing returns to step S515.

In step S525 N ACK/NACKs are bundled by the UE and the UE sends a report. For example, the UE can generate a report based on one or more ACK's and or NACK's over the N DL packets that were received. The ACK/NACK report can be a report that includes a number of ACK's and a number of NACK's with or without information associated the packets that did not have an error (ACK) and/or the packets that did have an error (NACK). In some implementations, the report includes information about the packets with errors (NACK) and no information about the packets without errors (ACK). In other words, the network can infer that any packet that does not have information in the report does not have an error. The report can be communicated to the network via the BS (e.g., NTN-BS). The report can be communicated using a PDCCH or PDSCH. Further, a counter associated with the number of DL packets received can be set to zero (0).

Figure 6:
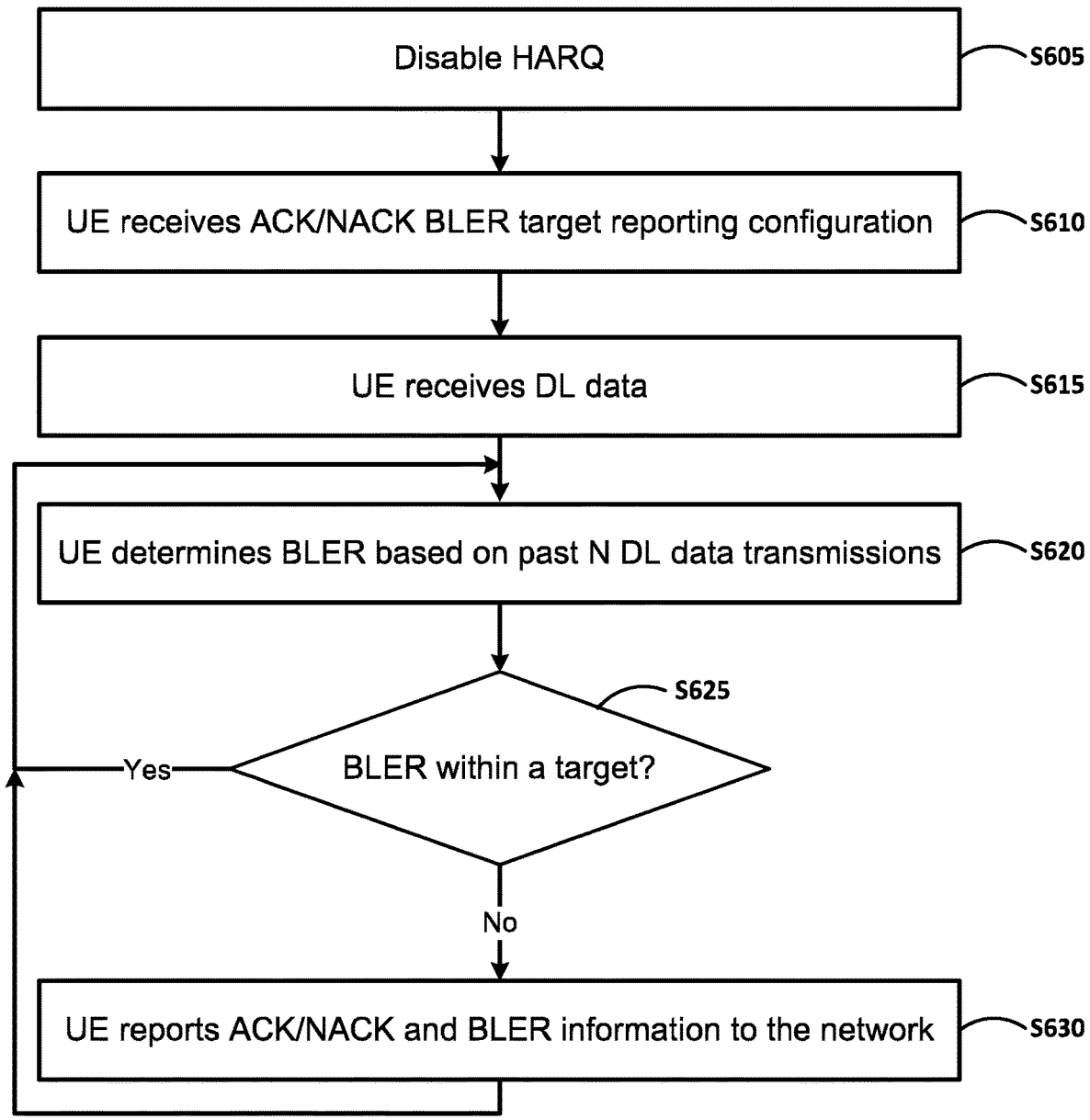
FIG. 6 is a flow chart illustrating operation of a user device according to an example embodiment.

FIG. 6 is a flow chart illustrating operation of a user device according to an example embodiment. As shown in FIG. 6, in step S605 HARQ is disabled. For example, the UE can receive a message (or signal) from the network. The message can be received via a BS (e.g., an NTN-BS, a gNB, and/or the like). In an example implementation, the message can be received via an NTN-BS (e.g., NTN-BS 160). The message can include a data packet including an instruction (e.g., a setting or configuration instruction). For example, the instruction can turn HARQ off (e.g., HARQ_Enable=OFF).

In step S610 an ACK/NACK BLER target reporting configuration is received by the UE. For example, the UE can receive a message from the network. The message can be received via a BS (e.g., an NTN-BS, a gNB, and/or the like). The message can be received on a PDCCH. In an example implementation, the message can be received via an NTN-BS (e.g., NTN-BS 160). The message can include a data packet including an instruction (e.g., a setting or configuration instruction). For example, the instruction can be an ACK/NACK configuration. The instruction can include a configuration setting for when the UE is to communicate an ACK/NACK to the network. The configuration setting may correspond to a trigger that causes the UE to generate an ACKNACK report and to communicate the ACK/NACK report to the network. Further, the instruction can include a configuration setting a trigger based on BLER. The trigger can be a rolling accumulation of the BLER over N DL packets. In response to the BLER exceeding a threshold or target value or range, an event can be triggered. Further, in response to the BLER being less than a threshold or target value or range, an event can be triggered. In an example implementation, the BLER target can be based on maintaining BLER in a target range.

In step S615 DL data is received by the UE. For example, the network can go into a data communication mode where DL data is communicated from the network to the UE via a BS (e.g., NTN-BS). UL data can be communicated from the UE to the network via the BS (e.g., NTN-BS) as well. The DL data and/or UL data can be related to text and/or voice data, image data, streaming video data, social network data, and/or the like. The DL data can be communicated over a channel (e.g., a downlink shared channel (DL-SCH), PDSCH).

In step S620 the UE determines BLER based on past N DL data transmissions. For example, after each DL data packet is received, a BLER can be determined. The BLER can be a BLER over the last N DL data packets. In step S625 whether BLER is within a target is determined. In response to the BLER being within (e.g., a range) the target, processing returns to step S620. Otherwise, in response to the BLER not being within the target, processing continues to step S630.

In step S630 ACK/NACK and BLER information is reported by the UE to the network. For example, the UE can generate a report based on one or more ACK's and or NACK's over the N DL packets that were received. The ACK/NACK report can be a report that includes a number of ACK's and a number of NACK's with or without information associated the packets that did not have an error (ACK) and/or the packets that did have an error (NACK). In some implementations, the report includes a BLER base on the number of errors over the N DL data packets received. The report can be communicated to the network via the BS (e.g., NTN-BS). The report can be communicated using a PDCCH.

Figure 7:
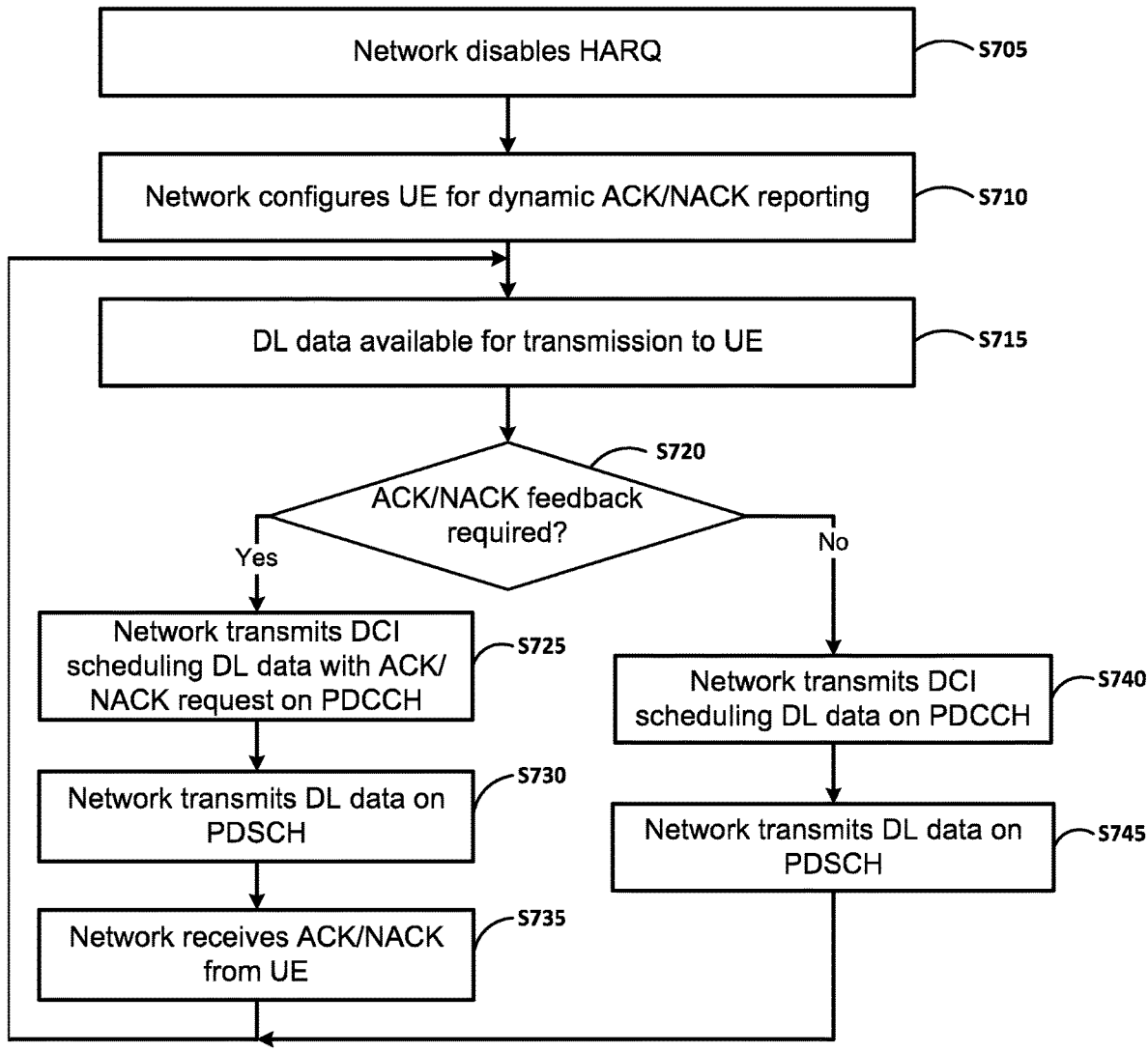
FIG. 7 is a flow chart illustrating operation of a network entity according to an example embodiment.

FIG. 7 is a flow chart illustrating operation of a network entity according to an example embodiment. As shown in FIG. 7, in step S705 HARQ is disabled by the network. For example, the network can communicate a message to the UE. The message can be communicated via a BS (e.g., an NTN-BS, a gNB, and/or the like). In an example implementation, the message can be communicated via an NTN-BS (e.g., NTN-BS 160). The message can include a data packet including an instruction (e.g., a setting or configuration instruction). For example, the instruction can turn HARQ off (e.g., HARQ_Enable=OFF).

In step S710 the UE is configured by the network for dynamic ACK/NACK reporting. For example, ACK/NACK can be disabled at the UE. Then, the network (e.g., an NTN-BS) can communicate as message to the UE. The message can include an instruction to report an ACK/NACK. Therefore, configuring the UE for dynamic ACK/NACK reporting can include disabling ACK/NACK at the UE and configuring the network (e.g., an NTN-BS, a gNB, and/or the like) to request an ACK/NACK as needed.

In step S715 DL data is available for transmission to UE. For example, the network can go into a data communication mode where DL data is communicated from the network to the UE via a BS (e.g., NTN-BS). The DL data can be related to text and/or voice data, image data, streaming video data, social network data, and/or the like. The DL data can be communicated over a channel (e.g., a downlink shared channel (DL-SCH), PDSCH). The DL data can be available for transmission when a data packet is generated and scheduled for transmission.

In step S720 whether ACK/NACK feedback is required is determined. For example, as discussed above, a link adaptation algorithm can depend on ACK/NACK feedback to continuously update the threshold for MCS selection based on the target BLER. Disabling ACK/NACK feedback can cause link adaption (outer-loop and inner-loop) to not function as intended and the gNB scheduler may not perform as desired. Therefore, determining ACK/NACK feedback is required can be based on the link adaptation algorithm requirements. In other words, determining ACK/NACK feedback is required can be based on internal criteria at the network (e.g., traffic type, remaining data buffer, system load, number of RLC retransmissions, and/or the like). In response to determining ACK/NACK feedback is required, processing continues to step S725. In response to determining ACK/NACK feedback is not required, processing continues to step S740.

In step S725 downlink control information (DCI) scheduling DL data with ACK/NACK request is transmitted by the network on PDCCH. The PDCCH can be communicated in at least one control resource set (CORESET) or search space. The PDCCH can be configured to be used for communicating scheduling decisions as made by the BS (e.g., an NTN-BS). Therefore, the scheduling for the DL data and the ACK/NACK request can be communicated to the UE from the network (e.g., an NTN-BS). The ACK/NACK request can include configuration information such that the UE can be configured to generate an ACK/NACK report based on the network criteria.

In step S730 DL data is transmitted by the network on PDSCH. For example, the data packet generated and scheduled for transmission above, can be communicated to the UE using the physical downlink shared channel (PDSCH).

In step S735 ACK/NACK is received by the network from the UE. For example, the UE can generate an ACK/NACK report based on a UE ACK/NACK configuration (e.g., as set by the network). The UE can then communicate the ACK/NACK report to the network (e.g., an NTN-BS) via (or using) the physical uplink control channel (PUCCH).

In step S740 DCI scheduling DL data is transmitted by the network on PDCCH. For example, the DCI can be communicated via the PDCCH or PDSCH. The PDCCH can be configured to be used for communicating scheduling decisions as made by the BS (e.g., an NTN-BS). Therefore, the scheduling for the DL data can be communicated to the UE from the network (e.g., an NTN-BS).

In step S745 DL data is transmitted by the network on PDSCH. For example, the data packet generated and scheduled for transmission above, can be communicated to the UE using the PDSCH.

Trigger Conditions for Communicating an ACK/NACK Report

A network (e.g., NTN-BS, gNB and/or the like) can configure the UE to report single or bundled ACK/NACK after every N DL transmissions by the network. A single ACK/NACK can refer to the ACK/NACK information for the Nth transmission.

A network (e.g., NTN-BS, gNB and/or the like) can configure the UE to report single or bundled ACK/NACK after every N DL transmissions by the network. A single ACK/NACK can refer to the ACK/NACK information for the Nth transmission. A bundled ACK/NACK can refer to the combined ACK/NACK (i.e., AND operation of all ACK/NACK) from N transmissions. The network may only need to monitor the PUCCH after every Nth DL transmission.

A network (e.g., NTN-BS, gNB and/or the like) can configure the UE to report single or bundled ACK/NACK after every x ms or after every x ms after a DL data packet transmission. A single ACK/NACK can refer to the ACK/NACK information after x ms. A bundled ACK/NACK can refer to the combined ACK/NACK (i.e., AND operation of all ACK/NACK) after x ms. A network may only need to monitor the PUCCH after every x ms.

A network (e.g., NTN-BS, gNB and/or the like) can configure the UE to report the number of NACKs after every N DL transmissions. For example, with 2-bit feedback, the UE can report $\{0, 1, 2, \geq 3\}$ NACKs every 10 DL transmissions. NACKs may be most useful for link adaptation, and number of ACKs can also be inferred from number of reported NACKs. A network may only need to monitor the PUCCH after every Nth DL transmission. Single or bundled ACK/NACK may be configured.

A network (e.g., NTN-BS, gNB and/or the like) can configure a condition for UE to report ACK/NACK. For example, the network can configure the UE to report ACK/NACK if the BLER is higher than a threshold. This can mean that the UE is keeping track of link adaptation algorithm performance and letting the network know if adjustments are needed. In this case, reporting can be MAC report instead of PHY and may contain additional information such as BLER, number of NACK in the last K transmissions, etc. Another example can be if the BLER increases y % over a certain time period, the UE can transmit ACK/NACK information right away. Another example can be if there have been z consecutive NACKs, the UE can transmit the number of NACKS right away.

ACK/NACK reporting can be dynamically indicated by DCI. ACK/NACK can be disabled by the network and requested dynamically as needed by the network (e.g., NTN-BS, gNB and/or the like). For example, if traffic is bursty or if the buffer may be empty soon then the network may not to do link adaptation. Therefore, no ACK/NACK may be requested. If the system is lightly loaded, the network can use more conservative link adaptation and larger number of resources for DL scheduling. Therefore, no ACK/NACK may be requested. If the system is heavily loaded, the network can be more aggressive in link adaptation to improve throughput. Therefore, ACK/NACK request can be made to ensure link adaptation is working as expected. If the network is seeing unexpected number of RLC retransmission, an ACK/NACK request can be made. Unused state in DCI may be re-purposed for ACK/NACK request. For example, if HARQ is disabled, there would be no need to indicate HARQ process number in the DCI, so the 4-bit field can be reused to request ACK/NACK and other information (e.g., single or bundled ACK/NACK, value of N (i.e., number of transmission before ACK/NACK), window size, etc).

For the above-mentioned implementations, the UE may be configured to report NACK only instead of ACK/NACK (i.e., DTX if ACK). This can require higher transmission power to avoid NACK→DTX detection error. However, since NACK should not be transmitted too often, it would result in UE power saving. ACK/NACK reporting may be configured based on traffic characteristics (e.g., video, FTP, HTTP) or network slice.

Figure 8:
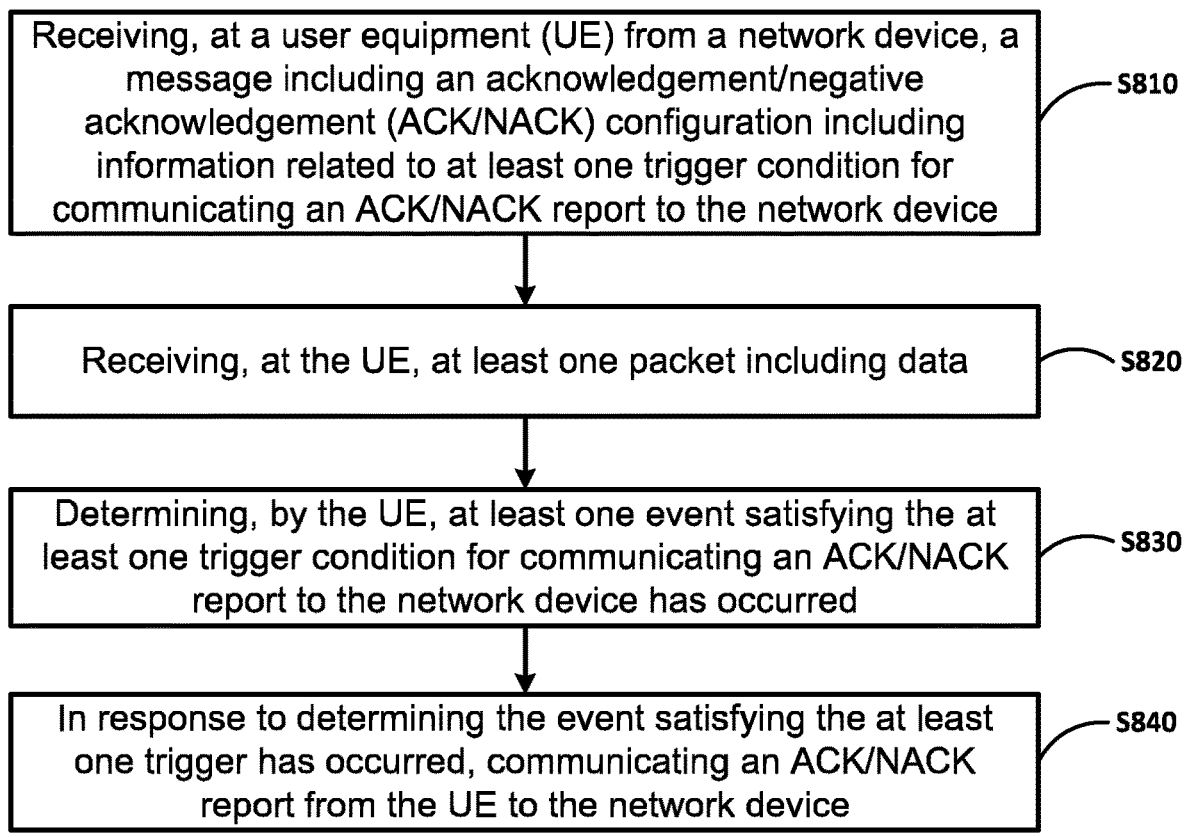
FIG. 8 is a flowchart illustrating operation of a user equipment according to an example embodiment.

Some Example Advantages:

Example 1. FIG. 8 is a flowchart illustrating operation of a user equipment. Operation S810 includes receiving, at a user equipment (UE) from a network device, a message including an acknowledgement/negative acknowledgement (ACK/NACK) configuration including information related to at least one trigger condition for communicating an ACK/NACK report to the network device. Operation S820 includes receiving, at the UE, at least one packet including data. Operation S830 includes determining, by the UE, at least one event satisfying the at least one trigger condition for communicating an ACK/NACK report to the network device has occurred. Operation S840 includes in response to determining the event satisfying the at least one trigger has occurred, communicating an ACK/NACK report from the UE to the network device.

Example 2. The method of Example 1, further including receiving, at the UE, a message signalling to disable hybrid automatic repeat request (HARQ).

Example 3. The method of Example 1 and Example 2, further including in response to determining the event satisfying the at least one trigger has occurred, determine whether there is an error associated with the decoding at least one packet including data, and in response to determining there is an error associated with the at least one packet including data generating the ACK/NACK report and communicating the ACK/NACK report only if there is an error associated with the at least one packet including data.

Example 4. The method of Example 1 to Example 3, wherein the at least one packet including data received by the UE includes two or more packets including data received by the UE, and the at least one trigger is based on a number of the two or more packets including data received by the UE.

Example 5. The method of Example 1 to Example 4, wherein the at least one packet including data received by the UE includes two or more packets including data received by the UE has been received over a period of time, and the at least one trigger is based on an amount of elapsed time since the UE has receive a first packet after communicating an earlier in time ACK/NACK report.

Example 6. The method of Example 1 to Example 5, wherein the trigger is based on a block error rate (BLER) associated with the at least one packet including dapta.

Example 7. The method of Example 6, wherein the at least one packet includes two or more packets that were received sequentially, the method further including generating a BLER based on an error condition associated with each of the two or more packets.

Example 8. The method of Example 1 to Example 7, wherein the at least one trigger is based on a message received by the UE from the network device, the message requesting the ACK/NACK report.

Example 9. The method of Example 1 to Example 7, wherein the at least one trigger is based on characteristics of the data.

Example 10. The method of Example 1 to Example 9, wherein the at least one packet includes two or more packets that were received sequentially, the method further including generating the ACK/NACK report to include the ACK/NACK from each of the two or more packets.

Figure 9:
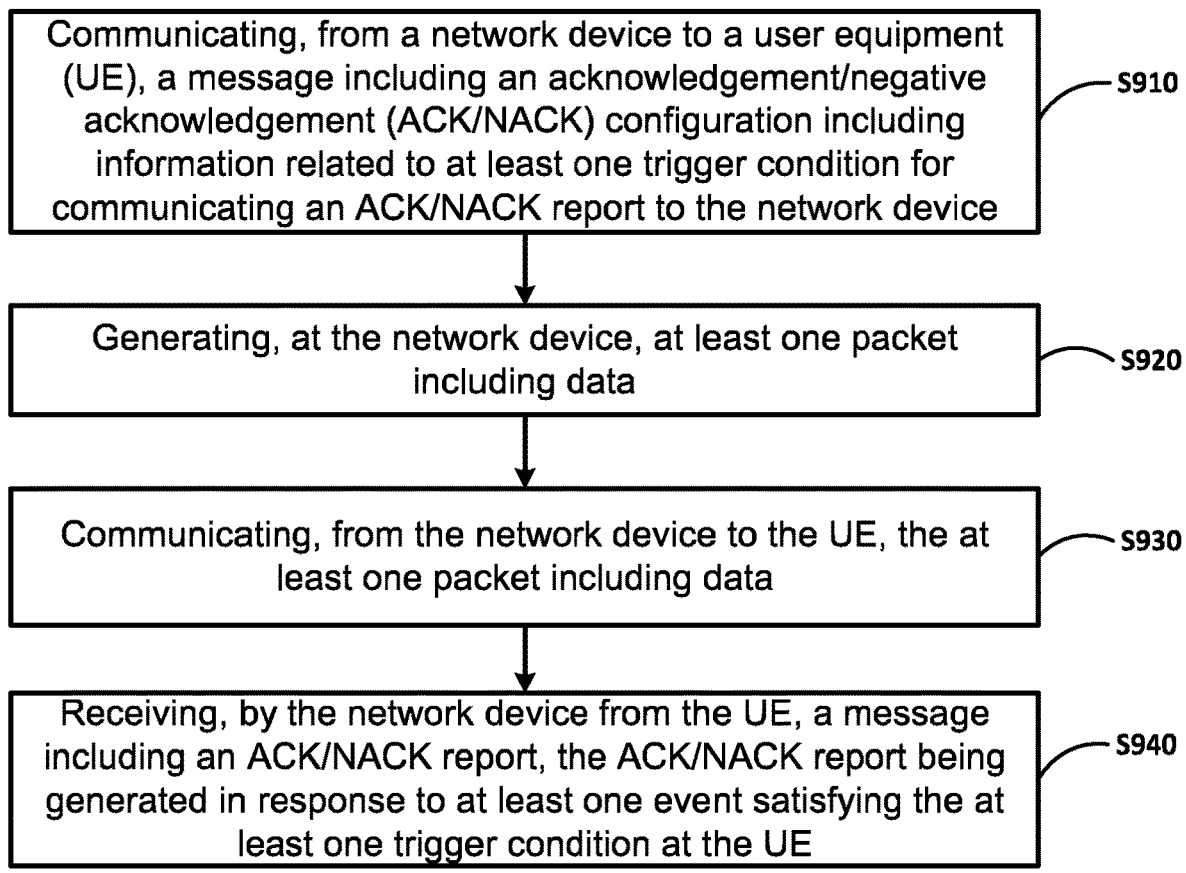
FIG. 9 is a flowchart illustrating operation of a network device according to an example embodiment.

Example 11. FIG. 9 is a flowchart illustrating operation of a network device. Operation S910 includes communicating, from a network device to a user equipment (UE), a message including an acknowledgement/negative acknowledgement (ACK/NACK) configuration including information related to at least one trigger condition for communicating an ACK/NACK report to the network device. Operation S920 includes generating, at the network device, at least one packet including data. Operation S920 includes communicating, from the network device to the UE, the at least one packet including data. Operation S940 includes receiving, by the network device from the UE, a message including an ACK/NACK report, the ACK/NACK report being generated in response to at least one event satisfying the at least one trigger condition at the UE.

Example 12. The method of Example 11, further including communicating, from the network device, at the UE, a message signalling the UE to disable hybrid automatic repeat request (HARQ).

Example 13. The method of Example 11 and Example 12, wherein the at least one packet including data includes two or more packets including data and the at least one trigger is based on a number of the two or more packets including data communicated to the UE.

Example 14. The method of Example 10 to Example 13, wherein the at least one packet including data includes two or more packets including data, the two or more packets are communicated over a period of time, and the at least one trigger is based on an amount of elapsed time after the UE has communicated an earlier in time ACK/NACK report.

Example 15. The method of Example 10 to Example 14, wherein the at least one trigger is based on a block error rate (BLER) associated with the at least one packet including data.

Example 16. The method of Example 10 to Example 15, wherein the at least one trigger is based on a message communicated by the network device to the UE, the message requesting the ACK/NACK report.

Example 17. The method of Example 10 to Example 16, wherein the at least one trigger is based on characteristics of the data.

Example 18. The method of Example 10 to Example 17, wherein the at least one packet includes two or more packets that were received sequentially and the ACK/NACK report to include the ACK/NACK from each of the two or more packets.

Figure 10:
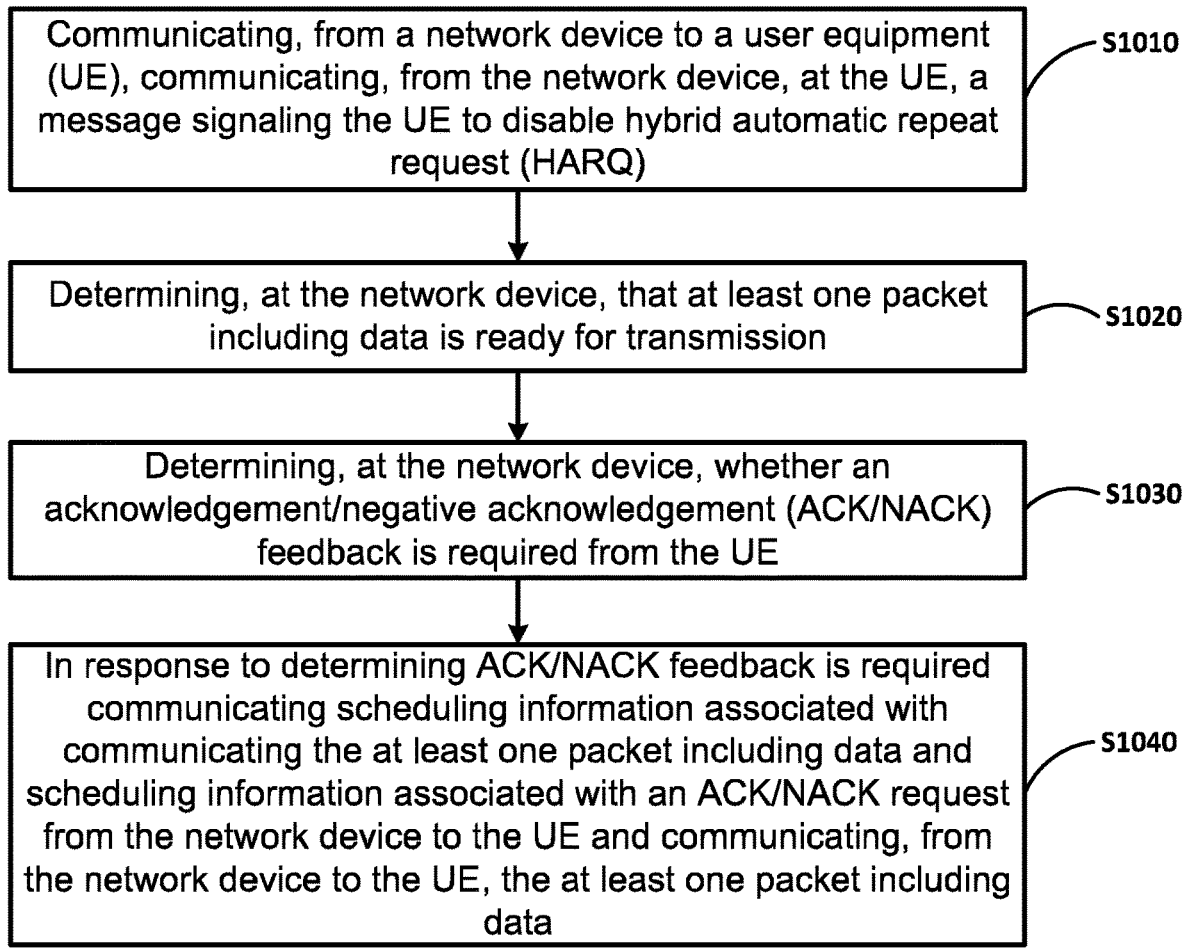
FIG. 10 is a flowchart illustrating operation of a network device according to an example embodiment.

Example 19. FIG. 10 is a flowchart illustrating operation of a network device. Operation S1010 includes communicating, from a network device to a user equipment (UE), communicating, from the network device, at the UE, a message signalling the UE to disable hybrid automatic repeat request (HARQ). Operation S1020 includes determining, at the network device, that at least one packet including data is ready for transmission. Operation S1030 includes determining, at the network device, whether an acknowledgement/negative acknowledgement (ACK/NACK) feedback is required from the UE. Operation S1030 includes in response to determining ACK/NACK feedback is required communicating scheduling information associated with communicating the at least one packet including data and scheduling information associated with an ACK/NACK request from the network device to the UE and communicating, from the network device to the UE, the at least one packet including data.

Example 20. The method of Example 19, further including receiving an ACK/NACK report in response to the ACK/NACK request and the communicated at least one packet including data.

Example 29. A non-transitory computer-readable storage medium comprising instructions stored thereon that, when executed by at least one processor, are configured to cause a computing system to perform the method of any of Examples 1-20.

Example 30. An apparatus comprising means for performing the method of any of Examples 1-20.

Example 31. An apparatus comprising: at least one processor; and at least one memory including computer program code; the at least one memory and the computer program code configured to, with the at least one processor, cause the apparatus at least to perform the method of any of Examples 1-20.

Figure 11:
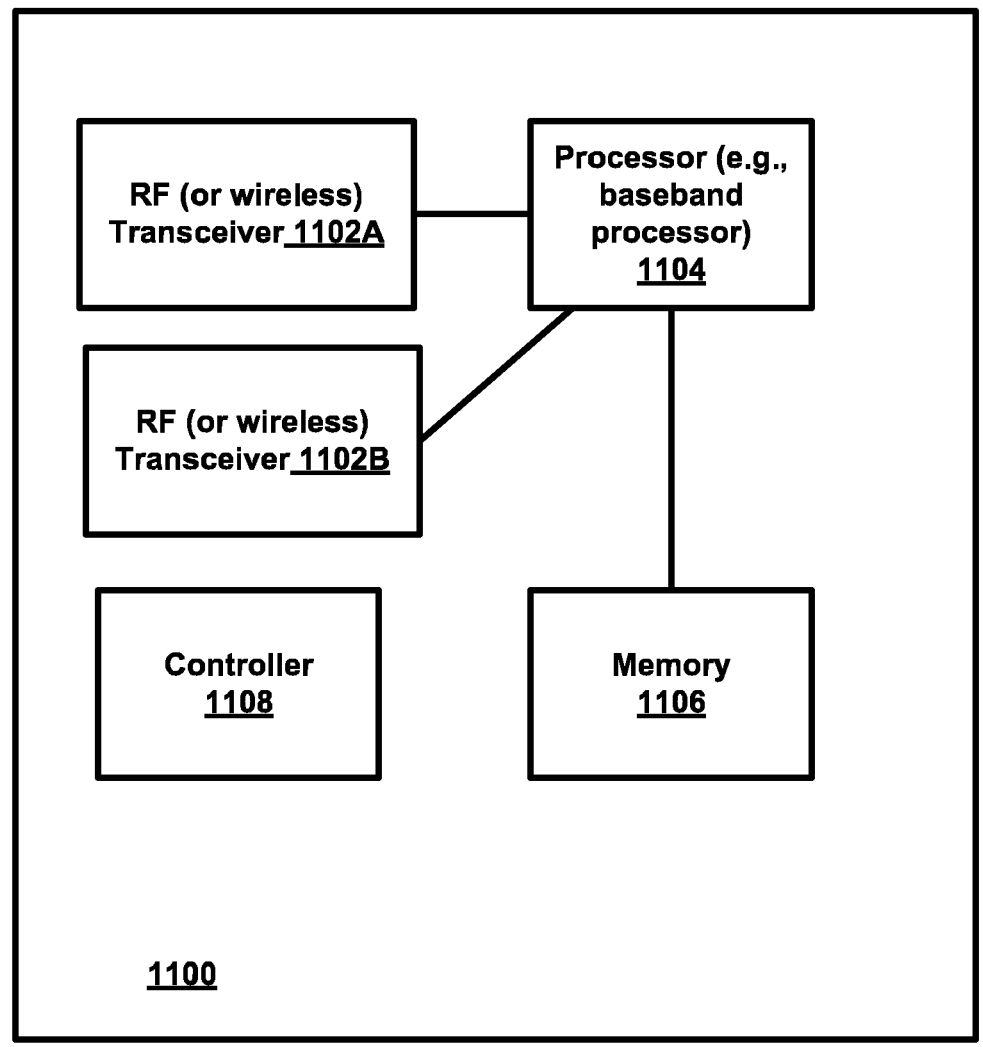
FIG. 11 is a block diagram of a wireless station or wireless node (e.g., AP, BS, gNB, RAN node, relay node, UE or user device, network node, network entity, DU, CU-CP, CU-CP, . . . or other node) according to an example embodiment.

FIG. 11 is a block diagram of a wireless station 1100 or wireless node or network node 1100 according to an example embodiment. The wireless node or wireless station or network node 1100 may include, e.g., one or more of an AP, BS, gNB, RAN node, relay node, UE or user device, network node, network entity, DU, CU-CP, CU-CP, . . . or other node) according to an example embodiment.

The wireless station 1100 may include, for example, one or more (e.g., two as shown in FIG. 11) RF (radio frequency) or wireless transceivers 1102A, 1102B, where each wireless transceiver includes a transmitter to transmit signals and a receiver to receive signals. The wireless station also includes a processor or control unit/entity (controller) 1104 to execute instructions or software and control transmission and receptions of signals, and a memory 1106 to store data and/or instructions.

Processor 1104 may also make decisions or determinations, generate frames, packets or messages for transmission, decode received frames or messages for further processing, and other tasks or functions described herein. Processor 1104, which may be a baseband processor, for example, may generate messages, packets, frames or other signals for transmission via wireless transceiver 1102 (1102A or 1102B). Processor 1104 may control transmission of signals or messages over a wireless network, and may control the reception of signals or messages, etc., via a wireless network (e.g., after being down-converted by wireless transceiver 1102, for example). Processor 1104 may be programmable and capable of executing software or other instructions stored in memory or on other computer media to perform the various tasks and functions described above, such as one or more of the tasks or methods described above. Processor 1104 may be (or may include), for example, hardware, programmable logic, a programmable processor that executes software or firmware, and/or any combination of these. Using other terminology, processor 1104 and transceiver 1102 together may be considered as a wireless transmitter/receiver system, for example.

In addition, referring to FIG. 11, a controller (or processor) 1108 may execute software and instructions, and may provide overall control for the station 1100, and may provide control for other systems not shown in FIG. 11, such as controlling input/output devices (e.g., display, keypad), and/or may execute software for one or more applications that may be provided on wireless station 1100, such as, for example, an email program, audio/video applications, a word processor, a Voice over IP application, or other application or software.

In addition, a storage medium may be provided that includes stored instructions, which when executed by a controller or processor may result in the processor 1104, or other controller or processor, performing one or more of the functions or tasks described above.

According to another example embodiment, RF or wireless transceiver(s) 1102A/1102B may receive signals or data and/or transmit or send signals or data. Processor 1104 (and possibly transceivers 1102A/1102B) may control the RF or wireless transceiver 1102A or 1102B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. A method comprising:
receiving, at a user equipment (UE) from a network device, a message signaling to disable hybrid automatic repeat request (HARQ);
receiving, at the UE from the network device, a message including an acknowledgement/negative acknowledgement (ACK/NACK) configuration including information related to at least one trigger condition for communicating an ACK/NACK report to the network device;
receiving, at the UE from the network device, at least one packet including data;
determining, by the UE, at least one event satisfying the at least one trigger condition for communicating an ACK/NACK report to the network device has occurred; and
in response to determining the event satisfying the at least one trigger has occurred, communicating an ACK/NACK report from the UE to the network device,
wherein the at least one trigger is based on a block error rate (BLER) associated with the at least one packet including data that satisfies a BLER threshold,
wherein the at least one packet includes two or more packets that were received sequentially,
the method further comprising:
generating a BLER based on an error condition associated with each of the two or more packets.

2. The method of claim 1, wherein the BLER trigger threshold is dynamically adjusted based on a quality-of-service (QOS) level associated with the received data.

3. The method of claim 1, further comprising:
in response to determining the event satisfying the at least one trigger has occurred, determine whether there is an error associated with the decoding at least one packet including data; and
in response to determining there is an error associated with the at least one packet including data: generating the ACK/NACK report, and communicating the ACK/NACK report only if there is an error associated with the at least one packet including data.

4. The method of claim 1, wherein:
the at least one packet including data received by the UE includes two or more packets including data received by the UE, and
the at least one trigger is based on a number of the two or more packets including data received by the UE.

5. The method of claim 1, wherein:
the at least one packet including data received by the UE includes two or more packets including data received by the UE has been received over a period of time, and
the at least one trigger is based on an amount of elapsed time since the UE has receive a first packet after communicating an earlier in time ACK/NACK report.

6. The method of claim 1, wherein the at least one trigger condition requires both the BLER across the two or more sequential packets exceeding the BLER threshold and an elapsed time since a most recent ACK/NACK report exceeding a timer.

7. The method of claim 6, wherein the BLER threshold is defined with respect to a type of error detected in the two or more packets, the type of error including at least one of: a cyclic redundancy check (CRC) failure, a decoding error, and a missed packet reception.

8. The method of claim 1, wherein the at least one trigger is based on a message received by the UE from the network device, the message requesting the ACK/NACK report, and wherein the ACK/NACK report comprises aggregated ACK/NACK results corresponding to the two or more sequential packets.

9. The method of claim 1, wherein the at least one trigger is based on characteristics of the data.

10. The method of claim 1, wherein the at least one packet includes two or more packets that were received sequentially, the method further comprising: generating the ACK/NACK report to include the ACK/NACK from each of the two or more packets.

11. A method comprising:
communicating, from a network device to a user equipment (UE), a message signaling the UE to disable hybrid automatic repeat request (HARQ) and further including an acknowledgement/negative acknowledgement (ACK/NACK) configuration including information related to at least one trigger condition for communicating an ACK/NACK report to the network device;
generating, at the network device, at least one packet including data;
communicating, from the network device to the UE, the at least one packet including data; and
receiving, by the network device from the UE, a message including an ACK/NACK report, the ACK/NACK report being generated in response to at least one event satisfying the at least one trigger condition at the UE,
wherein HARQ retransmissions at the UE are disabled, and the at least one trigger condition is based on a block error rate (BLER) generated across two or more sequential packets received at the UE.

12. The method of claim 11, wherein:
the at least one packet including data includes two or more packets including data, and the at least one trigger is based on a number of the two or more packets including data communicated to the UE.

13. The method of claim 11, wherein:
the at least one packet including data includes two or more packets including data, the two or more packets are communicated over a period of time, and the at least one trigger is based on an amount of elapsed time after the UE has communicated an earlier in time ACK/NACK report.

14. The method of claim 11, wherein the at least one trigger is based on a message communicated by the network device to the UE, the message requesting the ACK/NACK report.

15. The method of claim 11, wherein the at least one trigger is based on characteristics of the data.

16. The method of claim 11, wherein: the at least one packet includes two or more packets that were received sequentially, and the ACK/NACK report to include the ACK/NACK from each of the two or more packets.

17. A method comprising:
communicating, from a network device to a user equipment (UE), a message signaling the UE to disable hybrid automatic repeat request (HARQ);
determining, at the network device, that at least one packet including data is ready for transmission;
determining, at the network device, whether an acknowledgement/negative acknowledgement (ACK/NACK) feedback is required from the UE; and
in response to determining ACK/NACK feedback is required: communicating, from the network device to the UE, scheduling information associated with communicating the at least one packet including data and scheduling information associated with an ACK/NACK request from the network device to the UE, the trigger conditions including a block error rate (BLER) generated across two or more sequential packets at the UE with HARQ disabled, and communicating, from the network device to the UE, the at least one packet including data.

18. The method of claim 17, further comprising:
receiving an ACK/NACK report in response to the ACK/NACK request and the communicated at least one packet including data.

* * * * *